July 1, 1930.  R. H. WENTORF  1,769,729
COFFEE PERCOLATOR
Filed Dec. 31, 1929
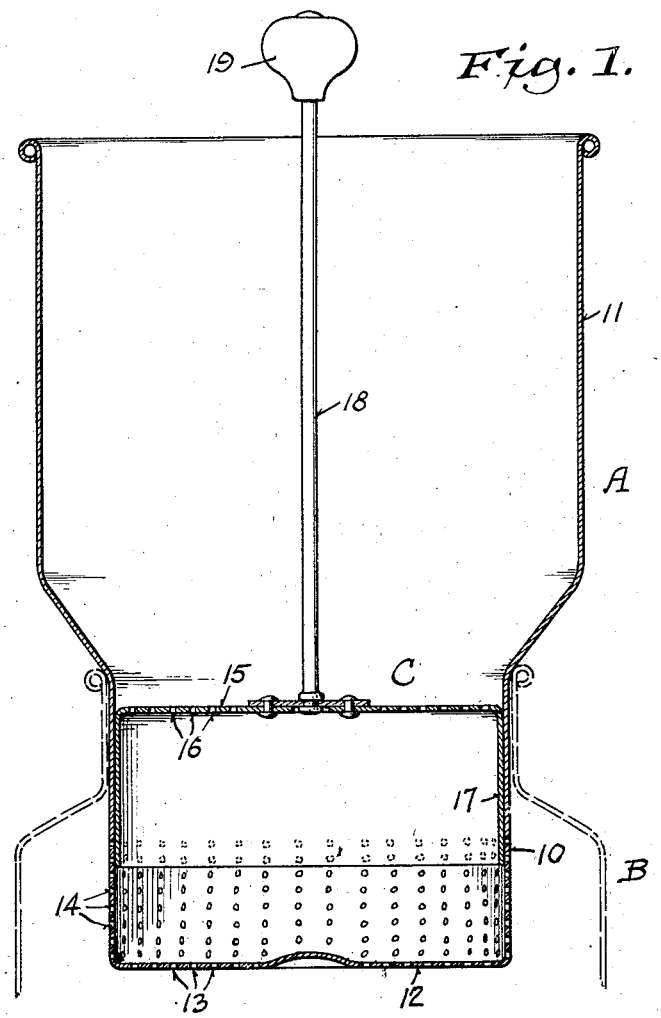
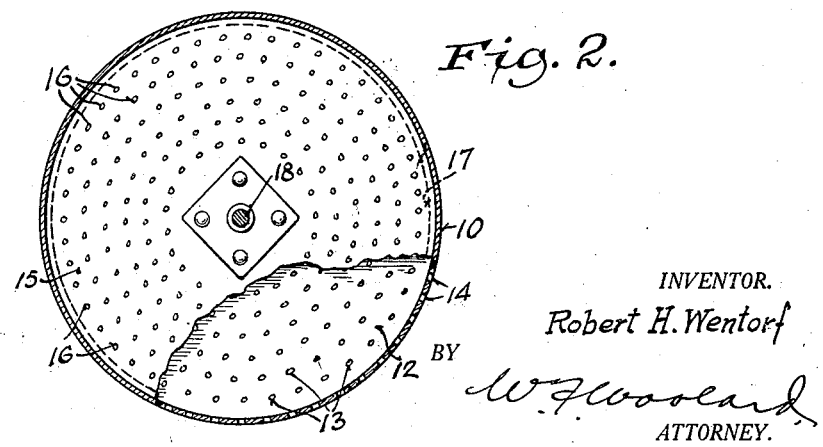
INVENTOR.
Robert H. Wentorf
BY
ATTORNEY.

Patented July 1, 1930

1,769,729

UNITED STATES PATENT OFFICE

ROBERT H. WENTORF, OF WEST BEND, WISCONSIN, ASSIGNOR TO WEST BEND ALUMINUM COMPANY, OF WEST BEND, WISCONSIN, A CORPORATION OF WISCONSIN

COFFEE PERCOLATOR

Application filed December 31, 1929. Serial No. 417,751.

The present invention relates to coffee percolators of the type first disclosed in an application Serial No. 417,750 filed concurrently by R. N. Kircher and me as joint inventors. The invention resides in certain improvements upon the structure shown in the said application.

In reducing the present invention to practice, I employ a tubular container having a reduced lower end constituting a coffee receiving compartment or chamber and an enlarged upper end constituting a hot water receiving compartment or reservoir, as shown generally in the said application, but somewhat modified in the present instance, together with a foraminous separator of novel construction and operation which is adapted to be positioned transversely of the container somewhere near the meeting line of the coffee receiving chamber and the hot water compartment.

Specifically, the coffee receiving chamber of the container constructed in accordance with the present invention, is provided in its side walls and bottom with a considerable number of fine perforations constituting a filter or screen through which the hot water permeated with the flavors and essences of the ground coffee may pass, but which will prevent the passage of the ground coffee. Such separator is adjustable as to position, so as to regulate the movement of the hot water through the lateral perforations in the side walls of the chamber, this being effected by providing the separator with a circular flange or skirt which is adapted to engage the walls of the coffee chamber and act as a shield for some or all of the lateral perforations leading from the said chamber. By this means, the flow of the water may be controlled by retarding it more or less, so that a complete infusion of the coffee may be obtained.

Having thus outlined the nature and purposes of my invention, I will now describe the same in particular, and will point out the novelty thereof in the appended claims.

In the accompanying drawing:

Figure 1 is a vertical, central, sectional view showing a container of special and preferred construction, with my separator in position therein, and showing also in phantom the upper part of a coffee pot in the mouth of which the percolator has been placed.

Fig. 2 is a plan view of the separator, positioned as in Fig. 1, and partly broken away to show the construction of the coffee receiving chamber, the latter being sectioned on a transverse line near its upper end.

In the drawing, the letter A indicates the shell or container of the percolator, the letter B a coffee pot of conventional form, part of such pot being illustrated in phantom, and the letter C my improved separator.

As shown, the shell or container of the percolator is provided with a reduced lower portion 10 constituting a coffee receiving chamber of limited capacity, and an enlarged upper portion 11 constituting a hot water receiving compartment or reservoir of much greater capacity, the walls of the parts 10 and 11 merging at a point a little below the middle of the container, so as to produce a structure of the proportions described. The drawing illustrates the preferred form of the said shell or container, which is constituted as a one piece structure, open at its upper end and closed at its lower end. The bottom 12 of the coffee receiving chamber 10 is numerously perforated as at 13, and the side walls of the chamber are likewise provided with numerous lateral perforations 14, distributed around the lower end of the chamber from its bottom 12 to a line about midway of the length thereof. The perforations 13 and 14 are small enough to prevent the passage of ground coffee from the said chamber, but will permit the passage of liquid with a retarded flow.

The separator C is formed as a disc 15 and is provided with a plurality of small perforations 16. The separator disc 15 is provided with a depending circular flange or skirt 17, of a diameter about equal to that of the inside of the coffee receiving chamber, which flange or skirt is extended on lines parallel to the walls of the chamber and is adapted to engage the said walls with a slight friction, in the manner shown in Fig. 1.

The disc 15 of the separator has attached at or near its center an upstanding post 18, the upper end of which is provided with a handle or knob 19 of insulating material, the long handle being provided in order that the separator may be easily positioned in the container, and removed therefrom without discomfort due to heat generated in the operation of the device.

In using my invention, a quantity of ground coffee is placed in the coffee receiving chamber 10, and the separator C is inserted in the container and positioned at the desired point in the length of the container. A measured quantity of hot water, proportioned to the number of cups of coffee which it is desired to make, is then poured into the compartment or reservoir 11. The hot water passes with a retarded flow through the perforations 16 in the separator, and into the chamber below, where it infuses the ground coffee and extracts the flavors and essences therefrom. The hot water so charged continues its movement through the small perforations with which the bottom and walls of the chamber are provided, and then drips into the coffee pot B.

The separator being held in the desired position by the frictional engagement of the skirt or flange 17 with the walls of the chamber 10, may be easily shifted so as to cover or shield any desired horizontal rows of the lateral perforations 14, and so progressively regulate the rate of flow of liquid from the chamber into the coffee pot. If such outflow be retarded by adjustment of the position of the separator, a better extraction of the flavors and essences of the coffee will be obtained, and this will result in the production of a beverage of improved quality. The separator may be pushed so far into the coffee chamber that the flange or skirt 17 will cover all of the lateral outlets 14, in which case the flow of liquid from the chamber will be greatly retarded, leaving open only the perforations 13 in the bottom of the chamber, through which the extract will slowly find its way.

The movable separator further functions in confining the ground coffee entirely within the coffee chamber and prevents such coffee from rising to the surface of the column of water standing in the reservoir. In this manner, the coffee is subject to pressure by the head of water, and a better initial saturation is effected.

Having thus described my invention, what I claim and desire to secure by Letters Patent of the United States, is:

1. A coffee percolator comprising a tubular container open at its upper end and closed at its lower end, the said upper end constituting a water receiving compartment and the said lower end a coffee receiving chamber, such lower end being perforated to permit the flow of liquid therefrom, and a foraminous separator disposed between the water receiving compartment and the coffee receiving chamber and movable longitudinally of the container to regulate the flow of liquid from the said chamber.

2. A coffee percolator comprising a tubular container open at its upper end and closed at its lower end, the upper end being of enlarged diameter and constituting a water receiving compartment and the lower end being of smaller diameter and constituting a coffee receiving chamber, such lower end being perforated to permit the flow of liquid therefrom, and a foraminous separator disposed between the water receiving compartment and the coffee receiving chamber and movable longitudinally of the container to regulate the flow of liquid from the said chamber.

3. A coffee percolator comprising a tubular container open at its upper end and closed at its lower end, the said upper end constituting a water receiving compartment and the said lower end a coffee receiving chamber, the side walls of such chamber being perforated to permit the flow of liquid laterally therefrom, and a movable foraminous separator disposed between the water receiving compartment and the coffee receiving chamber, the said separator having a depending flange adapted in the movement of the separator to cover perforations in the walls of the chamber to regulate the flow of liquid from the said chamber.

4. A coffee percolator comprising a tubular container open at its upper end and closed at its lower end, the upper end being of enlarged diameter and constituting a water receiving compartment and the lower end being of reduced diameter and constituting a coffee receiving chamber, the bottom and side walls of such lower end being perforated to permit the flow of liquid therefrom, and a longitudinally movable foraminous separator disposed between the water receiving compartment and the coffee receiving chamber, the said separator having a depending flange adapted in the movement of the separator to cover perforations in the walls of the chamber to regulate the flow of liquid from the said chamber.

5. A coffee percolator comprising a one-piece tubular container open at its upper end and closed at its lower end, the said upper end being of enlarged diameter and constituting a water receiving compartment and the said lower end being of reduced diameter and constituting a coffee receiving chamber, the bottom of such lower end and the side walls of the chamber being perforated to permit the flow of liquid therefrom, and a longitudinally movable foraminous separator disposed between the water receiving compartment and the coffee receiving chamber, the said separator having a depending circular flange frictionally engaging the walls of the chamber and adapted in its movement to cover perforations therein to retard the flow of liquid from the said chamber In testimony whereof, I have signed my name at West Bend, this 5th day of December, 1929.

ROBERT H. WENTORF.